(12) United States Patent
Celia

(10) Patent No.: US 10,175,053 B2
(45) Date of Patent: Jan. 8, 2019

(54) METHOD FOR MANAGING A MAP OF A PERSONAL NAVIGATION DEVICE AND DEVICE THEREOF

(71) Applicant: SISVEL TECHNOLOGY S.R.L., None (TO) (IT)

(72) Inventor: Saverio Celia, Rivalta di Torino (IT)

(73) Assignee: SISVEL TECHNOLOGY S.R.L., None (TO) (IT)

( * ) Notice: Subject to any disclaimer, the term of this patent is extended or adjusted under 35 U.S.C. 154(b) by 64 days.

(21) Appl. No.: 14/346,245

(22) PCT Filed: Sep. 21, 2012

(86) PCT No.: PCT/IB2012/055020
§ 371 (c)(1),
(2) Date: Mar. 20, 2014

(87) PCT Pub. No.: WO2013/042072
PCT Pub. Date: Mar. 28, 2013

(65) Prior Publication Data
US 2014/0222340 A1  Aug. 7, 2014

(30) Foreign Application Priority Data
Sep. 23, 2011 (IT) .............................. TO2011A0850

(51) Int. Cl.
*G01C 21/34* (2006.01)
*G06F 17/30* (2006.01)
*G01C 21/32* (2006.01)

(52) U.S. Cl.
CPC ............. *G01C 21/34* (2013.01); *G01C 21/32* (2013.01); *G01C 21/3484* (2013.01); *G06F 17/30241* (2013.01)

(58) Field of Classification Search
None
See application file for complete search history.

(56) References Cited

U.S. PATENT DOCUMENTS

2005/0278386 A1* 12/2005 Kelly ................ G06F 17/30241
2009/0292458 A1* 11/2009 Nakamura ............. G01C 21/32
701/532

(Continued)

FOREIGN PATENT DOCUMENTS

JP       2002098535       4/2002
JP       2004-212253 A    7/2004

(Continued)

OTHER PUBLICATIONS

International Preliminary Report on Patentability and Written Opinion dated Mar. 25, 2014, issued PCT Application No. PCT/IB2012/055020, filed Sep. 21, 2012.

(Continued)

*Primary Examiner* — Charles J Han
(74) *Attorney, Agent, or Firm* — Workman Nydegger

(57) ABSTRACT

A method for managing a map (140) stored in a memory (130) associated with a personal navigation device (10), including a command and data entry unit (115) operable by a user, wherein the map (140) can be visualized on a display (115) and includes a road network, the method including the step of combining a first set of data about the road network, stored in the map (140), with a second set of data about at least one road not present in the road network or defined as not viable, in particular a new road, wherein the second data can be entered by the user by the command and data entry unit (115).

13 Claims, 13 Drawing Sheets

(56) References Cited

U.S. PATENT DOCUMENTS

| | | | | |
|---|---|---|---|---|
| 2010/0063727 A1* | 3/2010 | Umezu | ............... | G01C 21/32 701/532 |
| 2010/0125409 A1* | 5/2010 | Prehofer | ....................... | 701/207 |
| 2010/0131189 A1* | 5/2010 | Geelen et al. | ............... | 701/201 |
| 2010/0131193 A1* | 5/2010 | Shnyr | ................... | G01C 21/32 701/532 |
| 2015/0153186 A1 | 6/2015 | Geelen et al. | | |

FOREIGN PATENT DOCUMENTS

| | | |
|---|---|---|
| JP | 2006-266759 A | 10/2006 |
| JP | 2007-52341 A | 3/2007 |
| JP | 2010-500584 A | 1/2010 |
| JP | 2010-85890 A | 4/2010 |

OTHER PUBLICATIONS

International Search Report dated Jan. 18, 2013, in PCT Application No. PCT/IB2012/055020, filed Sep. 21, 2012.

\* cited by examiner

METHOD FOR MANAGING A MAP OF A PERSONAL NAVIGATION DEVICE AND DEVICE THEREOF

BACKGROUND OF THE INVENTION

1. Field of the Invention

The present invention relates to a method for managing a map stored in a memory associated with a personal navigation device.

The present invention also relates to a personal navigation device (PND) implementing said method.

2. Present State of the Art

Commercial PND devices are now largely used, which can give the user information about the instantaneous position of the device itself when it is near the terrestrial surface or within a certain distance therefrom, as well as information about the route that should be followed in order to arrive at a given place.

PND devices typically make use of information sent to the Earth from suitable satellites belonging to the so-called global navigation satellite systems (GNSS), which include, for example, GPS, GLONASS and the European Galileo system, which is still under development.

PND devices usually perform well only for a particular type of application. They are typically equipped with maps containing roads that can be travelled by vehicles of a certain kind, e.g. motor vehicles with two or more wheels, while such maps do not include those types of roads that cannot be travelled by the type of vehicle for which the PND's are intended.

For example, the maps of a PND device for vehicular use do not contain trails or paths that can only be travelled on foot and/or by vehicles having such dimensions and other structural characteristics (e.g. suspensions, chassis, wheels) that allow them to travel over these particular types of roads.

Within the scope of the present description, the term "road" will refer to any strip of ground of any length, generally with a constant width, intended for the transit of people or vehicles, regardless of its structural characteristics (asphalted or not, constant or variable width, one or more lanes, etc.) and of the type of transit allowed (people only, people and vehicles, vehicles only, special vehicles only, etc.).

A user needing a PND device for use not only on a road vehicle but also for mountain excursions or on a mountain bike must necessarily purchase one PND for each one of the above-mentioned uses, in that it is not generally possible to use the same PND for all such applications.

Some PND devices allow setting the mode in which a certain route to be computed must be travelled (whether on foot or on a vehicle), so that they can provide a solution which takes into account any footpaths and/or roads that cannot be travelled on foot, depending on the selected travelling mode.

However, the map on which the route is computed is always the same, and it is not possible to add thereto any roads that the user may have discovered and that for any reason are not shown on the map associated with the PND device.

Moreover, when new roads are opened or existing roads are modified, it is impossible to immediately update the map of the PND device. In some PND models, one can only enter variations pertaining to the road travelling direction, the speed limit, the presence of road blocks, and the like. However, one must necessarily wait for an updated version of the map for his/her own PND to be released, hoping that new roads or variations of existing routes will be included in the new version. Some PND devices allow users to signal any discrepancies between the maps and the places they refer to, so as to take into account all territorial variations: in any case, updates are not released more often than 3-4 times a year, because map providers need time to make all necessary verifications and to make sure that all variations are correct. Such updates typically concern only one category of roads, that is, those roads that can be travelled by certain types of vehicles for which the map is intended, and at any rate do not allow adding new roads not appearing on the map or marked thereon as not usable.

It is also possible to acquire a route from an electronic file and import it into a map of a PND device. However, when importing a file it is not possible to define which roads, if any, belong to the imported route, and therefore they cannot be actually incorporated into the map to allow using any roads of said route in future map displays and for computing future routes of any kind, whether for pedestrian or vehicular use.

SUMMARY OF THE INVENTION

It is therefore one object of the present invention to provide a method for managing a map of a personal navigation device which shows maps that can be immediately updated and take into account any road route variations or new roads or newly discovered roads, which should be saved into the map for future use or for computing new routes.

It is another object of the present invention to provide a method for managing a map of a personal navigation device which allows a final user to directly eliminate any discrepancies between the road network stored in the map and the one actually present on the territory.

It is a further object of the present invention to provide a method for managing a map of a personal navigation device which can be used by a variety of users and vehicles.

These and other objects of the invention are achieved through a method for managing a map of a personal navigation device and through a personal navigation device adapted to implement said method.

Further features of the invention are set out in the appended claims, which are intended to be an integral part of the present description.

BRIEF DESCRIPTION OF THE DRAWINGS

The above objects will become more apparent from the following detailed description of a method for managing a map of personal navigation device and of a personal navigation device implementing said method, with particular reference to the annexed drawings, wherein.

DETAILED DESCRIPTION OF THE PREFERRED EMBODIMENTS

Figure 1:
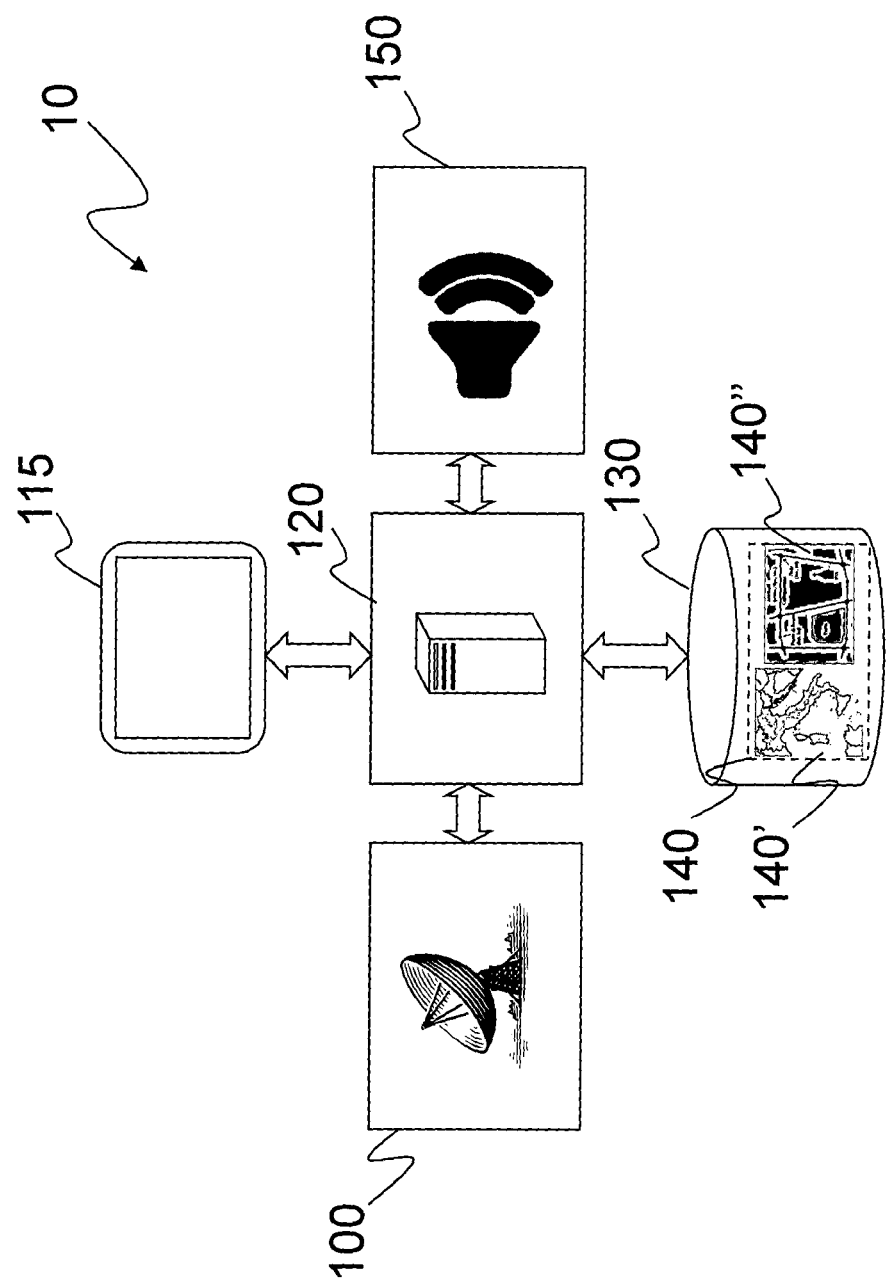
FIG. 1 is a block diagram of the structure of a personal navigation device (PND) according to the prior art.

FIG. 1 shows a block diagram of a generic PND device 10 according to the prior art.

The PND device 10 is equipped with a reception module of the GNSS type (Global Navigation Satellite System) 100 and possibly with other localization tools capable of receiving and providing data useful for computing the current position of the PND device 10, which are then sent to a microprocessor 120.

The microprocessor 120 is the governing and computing unit of the PND device 10, under the control of which the other units shown in FIG. 1 operate, whether directly or indirectly connected thereto. These include a memory containing all the data useful for the operation of the PND device 10, such as maps 140, user data, personal configurations and settings, previously selected destinations, points of interest, and the like. The memory 125 may also contain, whether partially or totally, the firmware necessary for the operation of the PND device 10, which may be made up of various parts and which may be of the volatile or non-volatile type, of the ROM or RAM type, removable from the PND device 10 or firmly integrated therein.

The map 140 can be represented in a graphic format 140' on a display or screen 115 and as map data 140", defining the geographic objects included in the map and the positions and spatial relations thereof. In both forms of the map 140 there is a first set of data relating to a road network extending on the territory covered by the map 140.

The display 115 allows displaying the maps, the calculated current position of the PND device 10, the points of interest in the surrounding area, and any other information that can be represented in graphic form on a screen.

Entering data and commands is made possible by a user entry unit 115, through which the user can enter a second set of data relating to at least one road not included in the road network of the map 140 or defined therein as being under construction. In general, the entry unit can be provided in any form and manner, e.g. by means of a keypad, a device for pointing to and selecting buttons associated with a screen, a voice command system, and the like.

In view of the implementation of the present invention, the following will describe a preferred embodiment thereof which uses a touch-screen display 115, i.e. a unit capable of acquiring commands and other input data when the screen itself is touched by a foreign body, based on graphic information displayed thereon and on the touch position.

Therefore, in this particular and non-limiting embodiment of the invention, the display 115 also acts as a command and data entry unit. The entry unit may be coupled by whatever means to the microprocessor 120, e.g. through a bidirectional communication bus capable of exchanging signals and data between the two terminal elements 115 and 120 connected thereto.

The display 115 may be a separate unit, a separable unit or a unit integrated into the same casing that contains the microprocessor and/or the other structural elements shown in FIG. 1, depending on the complexity, external dimensions and intended use of the PND device 10 (e.g. for use on a bicycle or a motorcycle, portable by hand, partially or totally incorporated into a vehicle).

A separate or separable display 115 and/or data entry unit may be connected to an apparatus that includes the other PND's components, enclosed in one frame, via a wireless connection (e.g. Bluetooth, Wi-Fi) or a wired connection, so as to make it easier to enter the current position in accordance with the present invention.

Furthermore, the PND device 10 may be associated, through an interface, with a audible actuator 150, i.e. a loudspeaker which allows reproducing the human voice or other warning sounds helping the user understand the instructions that the PND device 10 may issue by also using its display 115. FIG. 1 does not show other components, such as wired PC connection interfaces, e.g. USB ports, or wireless ones, e.g. Bluetooth.

Other components are not shown as well, which are not at all influential for the purpose of the present invention, such as WLAN or Wi-Fi radio communications terminals for access to remote computer systems, which may supply auxiliary data that can be used for locating the PND device 10, such as, for example, a magnetic compass, an altimeter, an odometer, and the like.

The PND device 10 also comprises other structural elements, such as a power supply unit and a battery.

Any PND device 10 is equipped with a graphic user interface, through which the user can adjust the modes of operation of the device, issue commands and enter data.

In a PND device 10 according to the invention, the user is given the possibility of directly adding new roads, which are interactively defined by specifying the route and attributes thereof (type, name, viability, etc.) through the display and command unit 115, by using functions and tools made available by the PND device 10 itself.

Upon a user's command, these added roads are incorporated into the map with which the PND device is associated, so that they can be displayed and/or used for computing future routes. Advantageously, such added roads can be displayed and/or used by the PND device 10 according to modes that can be adjusted by the user; they can also be modified or removed, so long as the user has the required permissions. In addition, the same map normally supplied along with the PND device 10 may be structured in a manner such that the roads it contains can be individually selected for editing or removed together with those added by the user.

Figure 2:
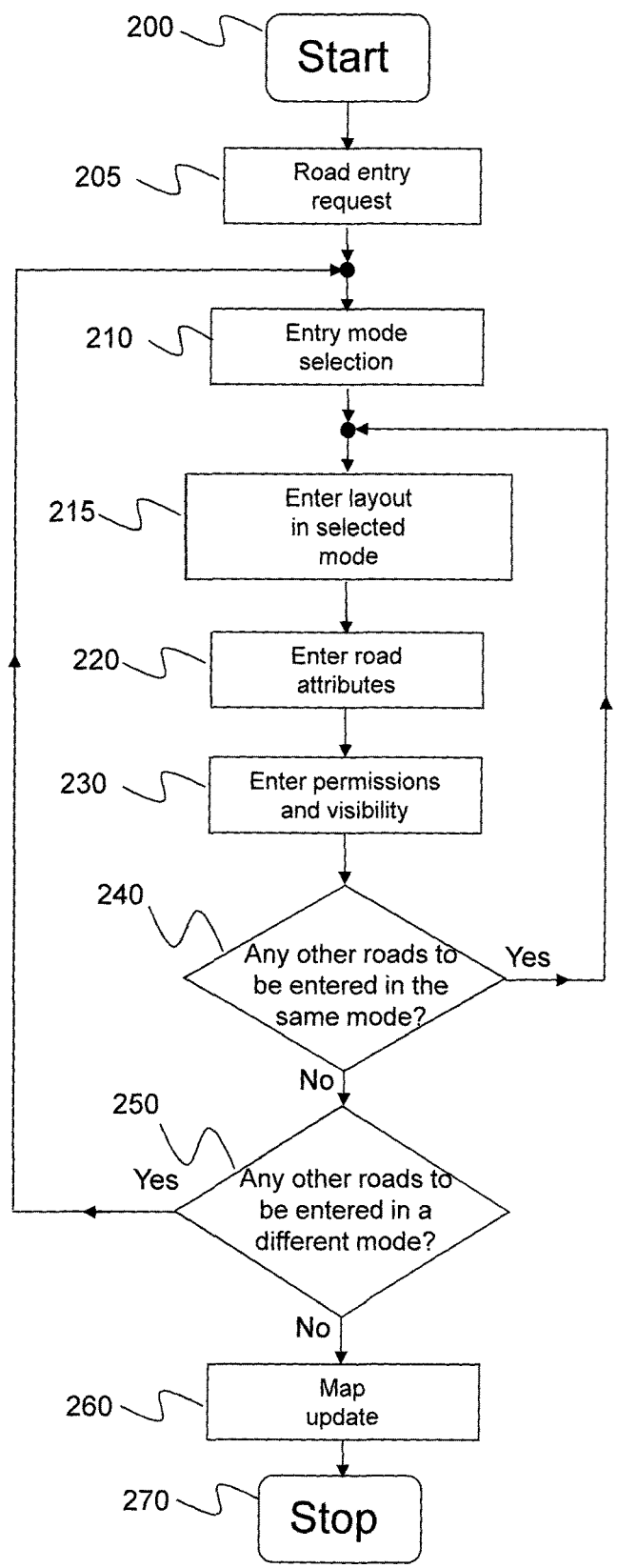
FIG. 2 is a flow chart of a possible embodiment of the invention.

FIG. 2 is a flow chart that shows the steps to be followed in order to add roads to a PND device 10 according to the invention.

Let us assume that the PND device 10 has been switched on and that, through the associated physical interface unit 115 (step 205), the user has requested the addition of a road by means of an appropriate guided entry procedure. This can be done simply by adding, for example, the item "Enter roads" to the command menu functions.

Figure 3:
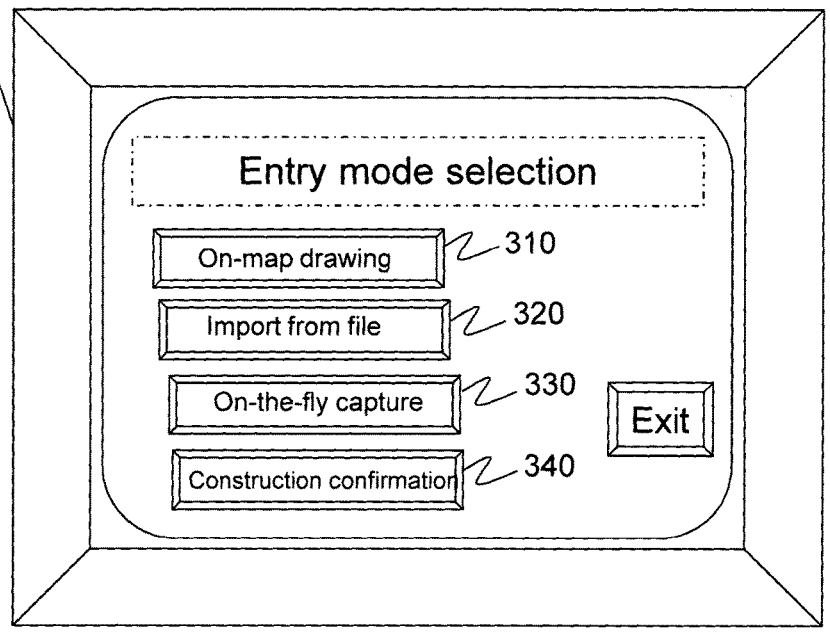
FIGS. 3 to 22 show screens that may be visualized on a display and control device of a PND device, corresponding to different steps of the flow chart of FIG. 2.

When said command is selected, the user is asked to select the road entry mode (step 210). A screen that may appear on the display 115 in response to this command is shown in FIG. 3. The road layout is then specified (step 215), which can be done in different ways according to the selected mode, as will be described more in detail below.

The next step 220 requires entering the road attributes (e.g. type, name, viability) and, if so desired, permissions for any future changes and for visibility (step 230), which may vary according to the user's needs.

Figure 21:
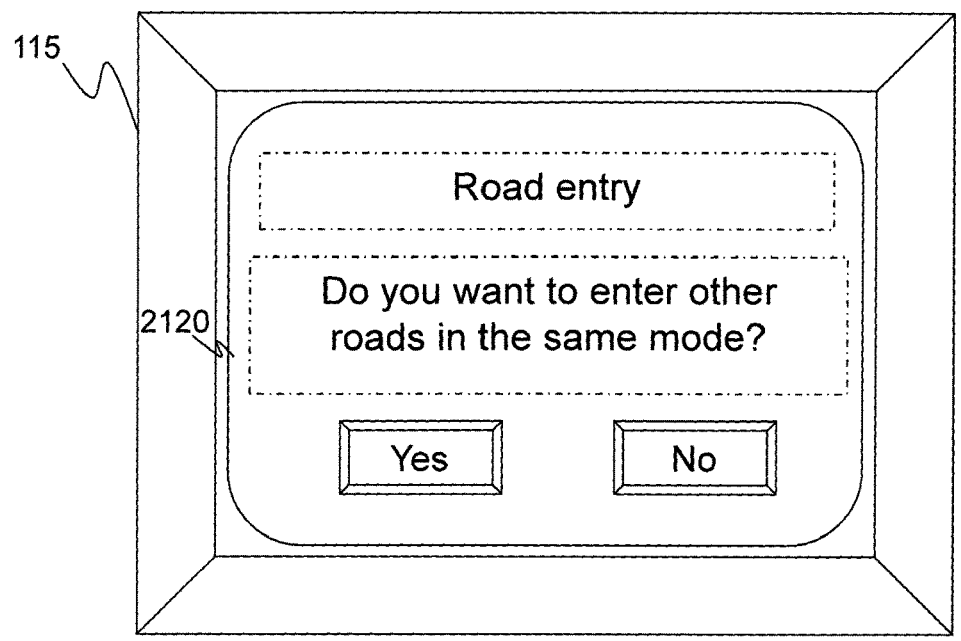

At the end of the road entry procedure, the user is asked if he/she wants to enter other roads in the same mode (step 240). FIG. 21 shows a possible interrogation screen 2120 concerning this step. If the answer is affirmative, then the PND device 10 will return to step 215 of entering a new road, by first entering the layout thereof. If the answer is negative, then step 250 will be carried out, in which the user is asked if he/she wants to add other roads in a different mode.

Figure 22:
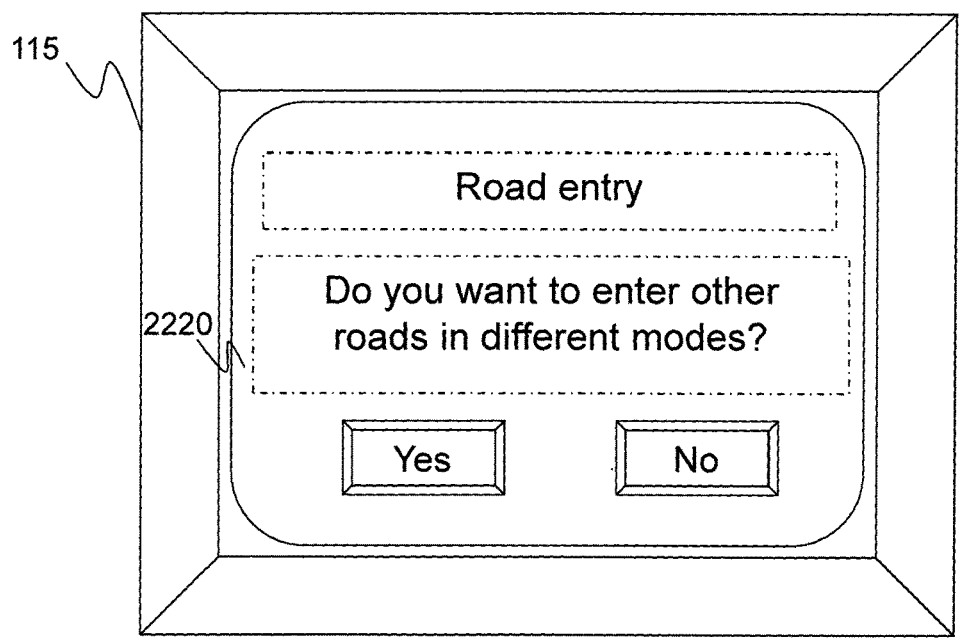

FIG. 22 shows a possible interrogation screen 2220 concerning this step. If the answer is affirmative, then the PND device 10 will go to step 210 of selecting the entry method, whereas if the answer is negative the actual updating of the map will be carried out (step 260) by adding to the map all the roads that have been entered during the entry procedure in any one of the available modes; the procedure will then end (step 270).

The road data entered by the user are combined with those already present in the map 140, and are stored into it based on the data and commands entered and on the information about the road network included in the map, in accordance with the parameters set during the procedure: in other words, the first set of data relating to the road network and stored in the map is combined with the second set of data relating to at least one new road, i.e. a road not present in said road network or defined therein as not viable (e.g. because it is still under construction or has been closed for maintenance), as entered by the user through the command and data entry unit 115.

As an alternative, the map may be individually updated immediately after each entry. Preferably, the combined data of the first and second sets are permanently stored into the memory 130, so that the data relating to the new road will not be lost following an interruption of the power supply to the PND device 10.

The various steps of the road entry process carried out by the user will now be described more in detail, by specifying their peculiar characteristics for each selectable mode.

The screen of FIG. 3 lists fours road entry modes. Let us now assume that the user has selected the first mode 310, called "On-map drawing". In this mode, the road layout is entered directly on the map, in that the user can do so because of the particular route involved. For example, the road might run parallel to a known section of a river or a railway already marked on the map of the PND device 10, or the road is short and straight and the user knows its two end points, which are situated at two crossings with adjacent roads, so that he/she can locate them directly on the map.

Figure 4:
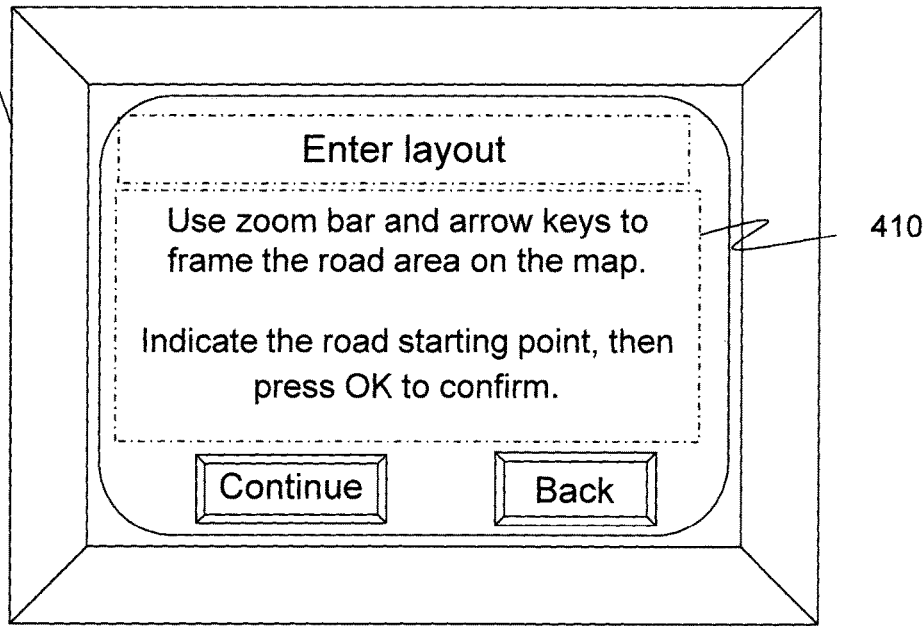

If the display and command unit is a touch screen, then the road layout can be entered in "On-map drawing" mode as stated in the instruction screen 410 of FIG. 4. The user must frame on the map 140 the area occupied by the road to be entered, the graphic representation 140' of which is shown on the screen.

To do so, the PND device 10 allows the user to move the framed area in the four directions on the display 115 by using virtual arrow keys 530 and a zoom in/out bar 520 (see FIG. 5), which can be fine-adjusted by pressing the virtual keys + and −, or coarse-adjusted by dragging the filled part of the virtual bar 520 upwards or downwards. As an initial frame of the graphic map representation 140', one may use the entire map or a predefined region, area or country (e.g. the one previously set by the user), the area surrounding a chosen place, or one or more positions recently recorded by the PND device 100, etc.

After having framed the area of interest (see FIG. 6), the user can touch on the screen the starting point 610 of the road to be entered. Of course, touch precision can be increased by using a pointed object instead of a finger, which might produce an excessively large touch surface.

Figure 7:
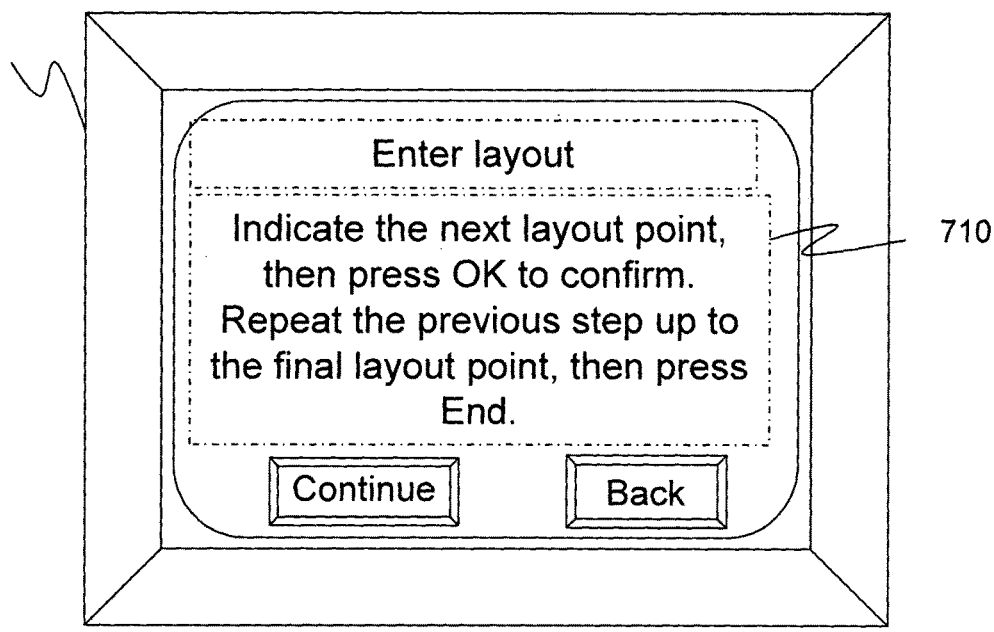

The user then presses the virtual key 620 "Continue" and the PND will prompt the user to enter the next point of the layout, e.g. as shown in the screen 710 of FIG. 7. For a winding or twisting road, the user will have to enter an adequate number of discontinuity points (referred to as shape points), which the PND device 100 will then join together by means of straight lines in order to obtain a layout as true as possible to the actual one.

Figure 8:
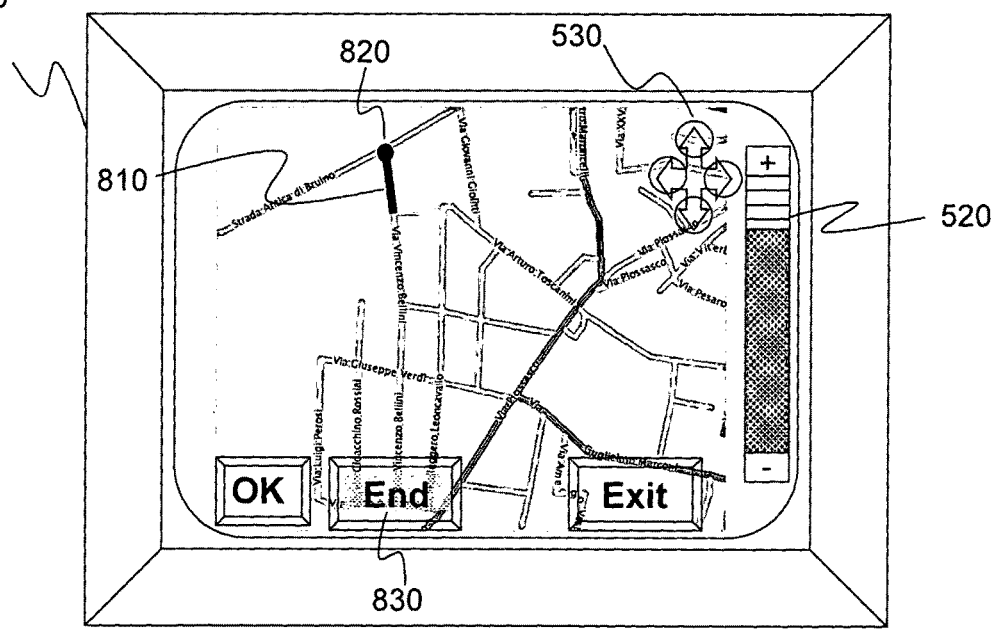

For simplicity (see FIG. 8), the case being considered herein takes into account a straight road 810 for which the user directly enters a second point 820 that represents the final point of the road. The PND device 10 is sent the command indicating the end of the road entry procedure by touching the virtual key 830 "End".

Figure 9:
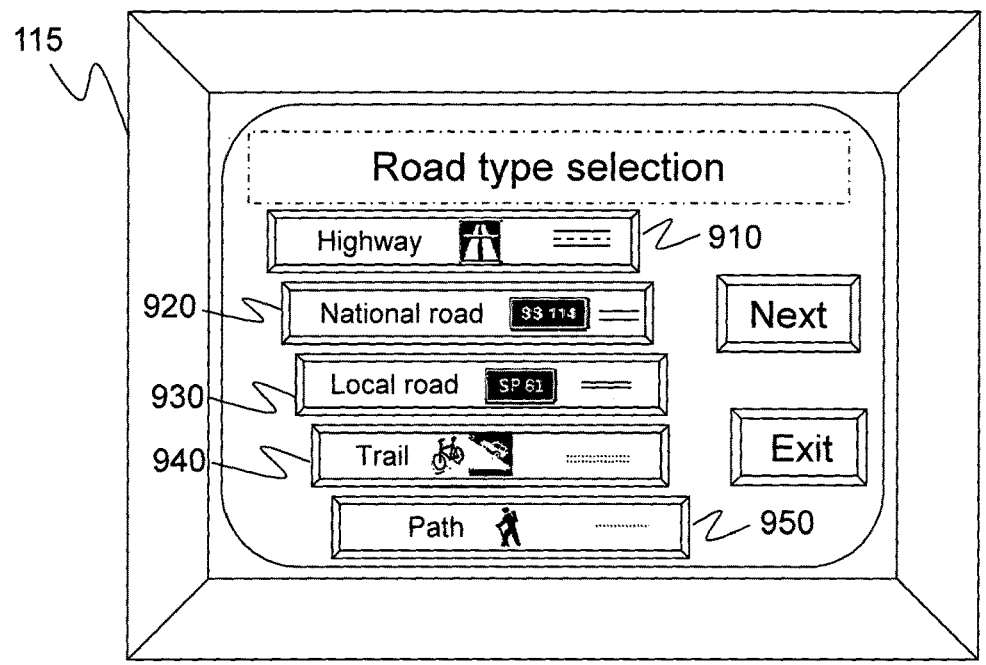

At this point, the user will be prompted to select the road attributes, starting from its type (FIG. 9). By way of example, it is assumed that the road may be a highway 910, a national road 920, a local road 930, a trail 940 or a path 950. A specific graphic symbol shown on a respective virtual key 910-950 is associated with each one of these road types, which symbol will be used for drawing the road on the graphic representation 140' of the map 140, and is preferably equal or similar to the one already in use for the same categories of existing roads.

Subsequently (FIG. 10), the user can enter other attributes of the road to be added, such as its name 1010 and its practicability 1020, i.e. the types of vehicles that can travel over it, if they are partially different from those that can be deduced from the category the road belongs to (pedestrians only, pedestrians and mountain bikes only, all-terrain vehicles only and no ordinary vehicles, etc.). The road attributes may comprise viability in terms of allowed travel direction and/or opening period. Finally, the user may be allowed to associate notes of any kind with the road, which notes may be displayed on the map when that road is framed on the display 115, upon a user's command or in other predetermined circumstances.

Figure 10:
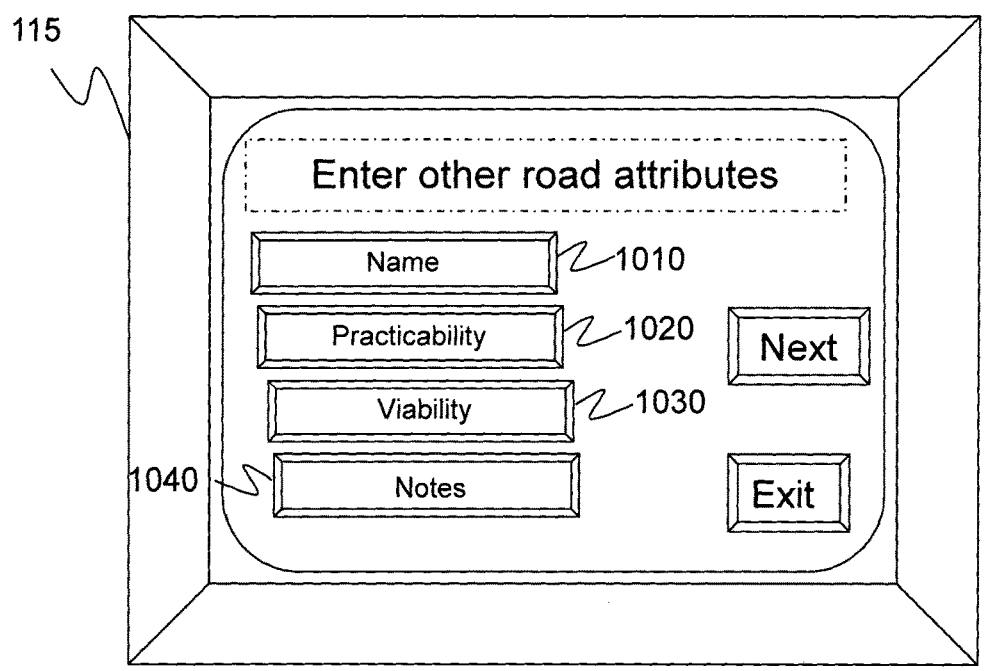
Figure 11:
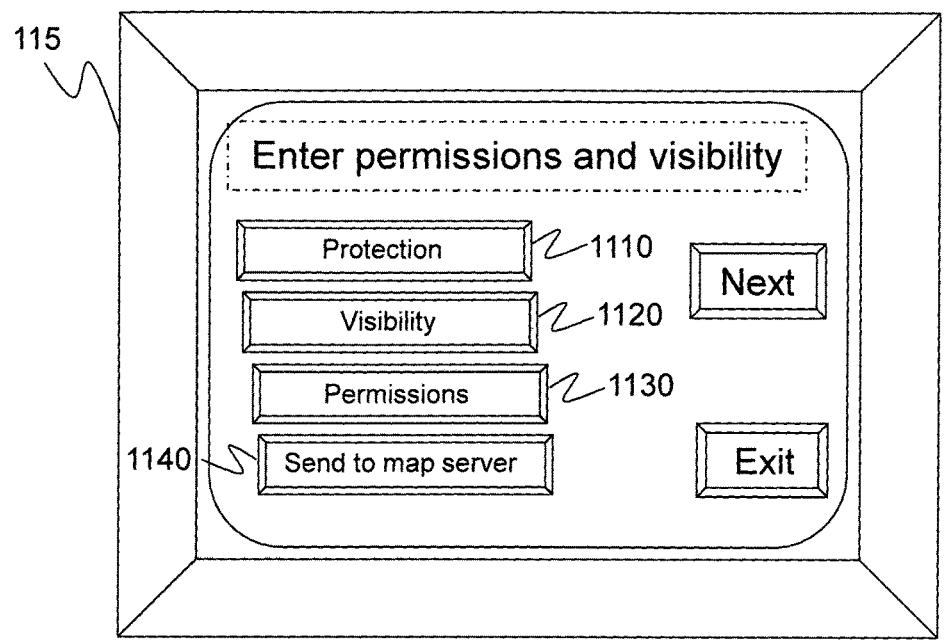

Of course, other attributes may possibly be added, which are not shown in FIGS. 9-11, such as, for example, speed limits, if different from the default ones associated with that specific road type in the country concerned, maximum allowable weight and dimensions of the vehicles circulating on that road, and so on.

Preferably (FIG. 11) the user may also, for example, associate with the road being added a password 1110 to be entered into the PND device 10 should any further editing be required (modification and/or deletion). Upon activation of the virtual key 1110 "Protection", the user can enter a particular password, without entering which it will be impossible to execute certain protected operations that should not be available to unauthorized users. By default, the PND device 10 can associate with the road being entered the password of the user who is entering it.

The user can also define the visibility 1120 of the road in a different way according to the user currently logged in. Upon touching this virtual key 1120, the PND device 10 will display one or more screens where this option can be set.

If user management has been turned on, the PND device 10 can display on the map different roads depending on the current user. When turning on or restarting the apparatus, the PND device 10 will prompt the user to enter his/her credentials (e.g. user name and/or password), and throughout that user's session it will show on the map only those roads which that user is allowed to see in accordance with the visibility settings previously defined. This allows protecting the user's privacy when the PND device 10 is used by several people who do not want to let others know which roads were added by them in the past. Of course, the active user can be changed also after the PND device 10 has been turned on, by entering his/her credentials, if required.

Visibility may also be bound to a use profile of the PND device 10, so that the map will only show those roads which can be travelled by the entity (pedestrian or vehicle type) associated with the currently active profile. If this function is on, the PND device 10 will show the road being entered only if it has been set to be visible for that particular use profile: the associations between road attributes (type, practicability, notes) and visibility for a given use profile may be predefined when manufacturing the PND device 10 and possibly editable by certain users or categories of users in a special visibility settings menu incorporated into the apparatus' control menu.

By default it may have been set that all roads added by a user are visible to all other users and/or that such roads can be travelled by all entities of a given type, for which a set of entities has been predefined which are allowed to travel such roads without any limitations whatsoever.

A further option that may be shown on this screen is the possibility of automatically sending the information about the road being entered to a suitable remote map server in order to signal its presence and demand that the map provider correct the map in the next version thereof. This may also be regarded as simply planning a transmission, which will only be carried out when a remote connection is available which meets user-definable preset criteria such as, for example, connection cost and type (radio mobile network, network operator, network terminal associated via wired or wireless connection, Wi-Fi, etc.). The map server may be connected to the Internet, and its reachability address may be predefined when manufacturing the PND device 10 and can be modified by the user should the map provider change.

As a further option, one may also be allowed to send the data of the second set of data relating to a new road, entered by the user, to another PND device 10 connected to the PND device 10 via a wired or wireless connection, so as to share such data with other PND owners.

At this point, the road entry process in on-map drawing mode will end, and the PND device 10 will ask the user if he/she wants to enter another road in the same mode or in a different mode, as already explained in the description of the flow chart of FIG. 2 with reference to FIGS. 21 and 22.

Figure 12:
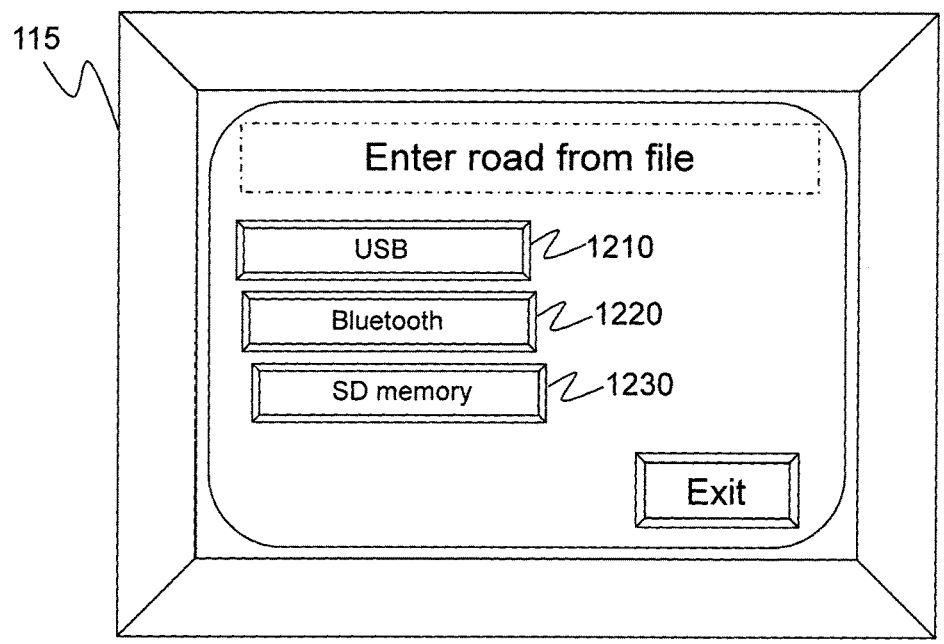

The second road entry mode is importing a route in the form of an electronic file readable by the PND device 10, e.g. in GPX format. When the user selects the corresponding option 320 shown in FIG. 3, the display 115 will show the screen of FIG. 12, which prompts the user to specify if the file is located in an external apparatus connected via USB (option 1210) or via Bluetooth (option 1220), or in a mass memory directly accessible to the PND device 10 (option 1230).

Depending on the selected option, the PND device 10 will ask to specify which folder of the mass memory of the external apparatus or directly accessible to the PND device 10 contains the file to be imported and, when this operation is done, a message will appear to confirm that the import process has been carried out successfully, requiring the user to continue by pressing a corresponding virtual key. At this point, the PND device 10 may show a screen similar to that of FIG. 13, thereby prompting the user to indicate on the map the outermost points of a section of the imported route that defines a road (message 1320).

When the user presses the virtual key 1330 "Next", a screen will display an area of the map (FIG. 14), which can be modified by the user through the virtual arrow keys 530 and which shows the imported route 1410 at a predetermined zoom level, which can be changed by the user by touching the virtual adjustment keys "+" and "−" of the zoom in/out bar 520.

Figure 15:
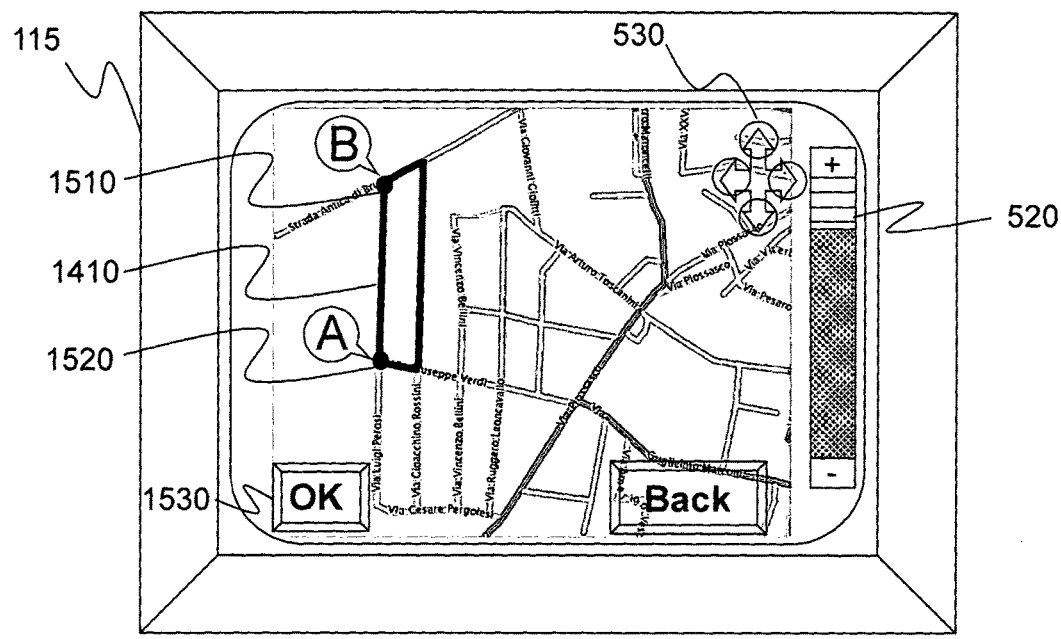

Let us now assume that the user touches the screen with a finger or with the tip of an object in the points 1510 and 1520 of FIG. 15, which are labelled as A and B by the PND device 10 to highlight the selected route section. The user will have to press the confirmation key 1530, and the PND device 10 will prompt him/her to select the road attributes as already described with reference to the "On-map drawing" mode of FIGS. 9-11.

Figure 13:
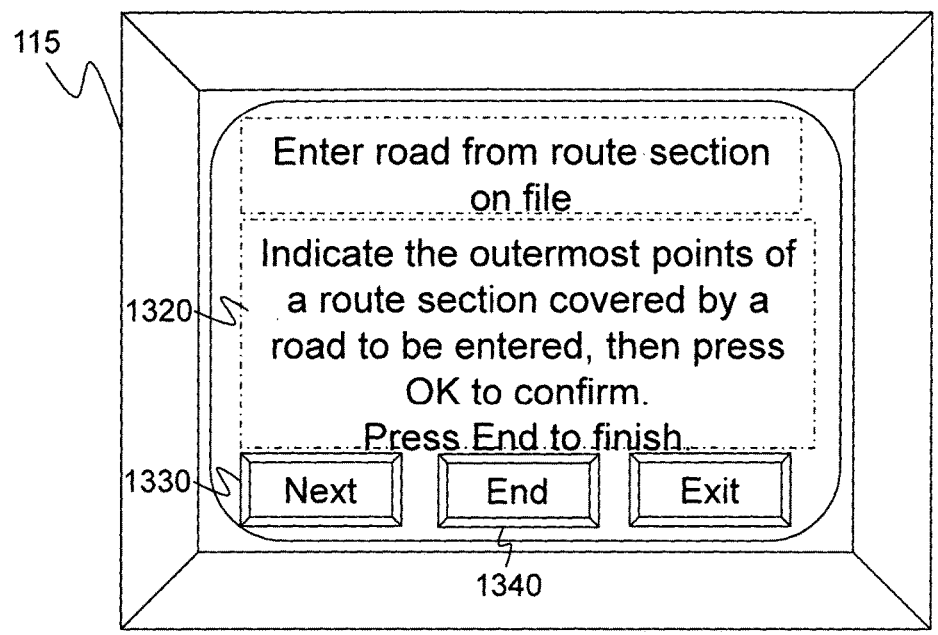

The PND device 10 will then ask the user if he/she wants to enter any additional roads covered by other sections of the imported route, for example by displaying the same screen of FIG. 13 and by repeating the steps described with reference to FIGS. 14 and 15, until the user decides to end the process of entering roads extracted from sections of the route 1410 by pressing the virtual key 1340 "End".

It must be pointed out that the imported route sections to be entered as roads may be either contiguous or not, i.e. they may or may not share any outermost points. Furthermore, some route sections may coincide with road sections already included in the map preloaded in the PND device 10, as it happens, for example, in the route 1410 of FIGS. 14 and 15.

Figure 16:
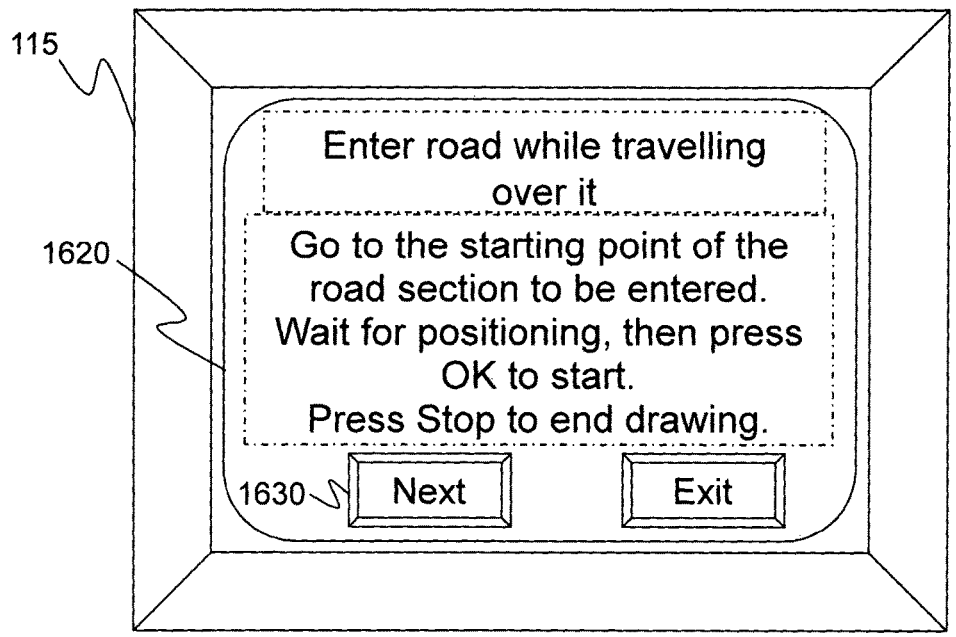
Figure 17:
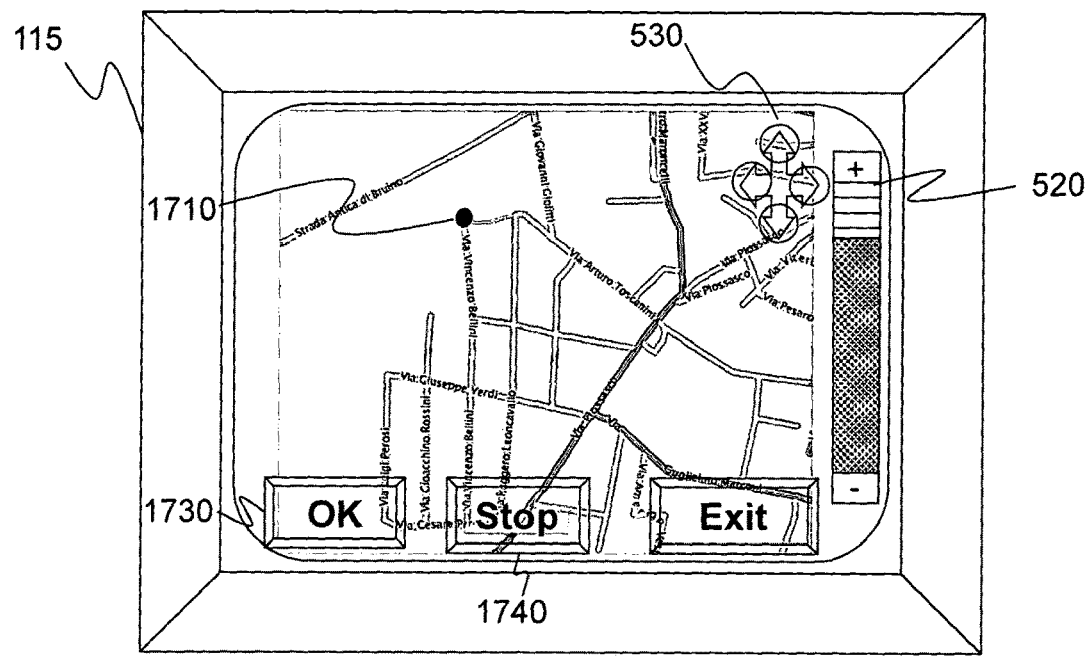
Figure 18:
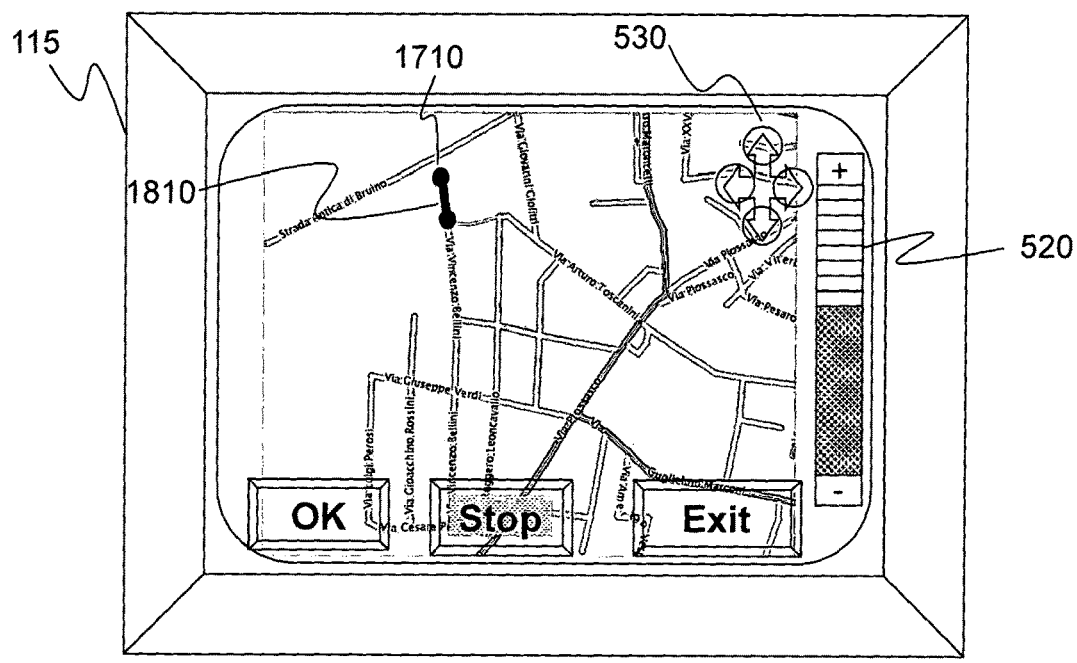

The third mode of entry is capturing the road as it is being covered. In this case, the PND device 10 will prompt the user to go to the starting point of the road to be entered and to wait for the PND device 10 to acquire the position of said point (message 1620 of FIG. 16). When the virtual key 1630 is pressed, the PND device 10 will show on the display 115 (see FIG. 17) a map frame that includes the point corresponding to the current position, which point will be displayed in an appropriate manner, e.g. by means of a dot 1710 of predefined size and colour.

When the user presses the virtual key 1730 "OK", the PND device 10 will start drawing the map by recording, with appropriate frequency, the coordinates of its own position until the user presses the virtual key 1740 "Stop".

In order to allow the user to monitor the drawing of the map during this process, the PND device 10 may show on the map the layout 1810 formed by the dots 1710 detected in succession starting from the initial one, preferably joined together by means of straight sections to form a continuous curve.

In the event that the GPS signal is subject to interruptions or to accuracy degradation caused by the capture environment (e.g. due to urban canyons, trees and the like), at the end of the drawing process the user may be allowed to manually modify the curve just drawn in order to correct any discontinuity or irregularity thereof.

At the end of the route entry (and possibly manual correction) step, the PND device 10 will prompt the user to enter the attributes and other characteristics of the road as already described with reference to the on-map drawing mode (FIG. 9-11). As usual, it will then be verified if the user wants to enter any additional roads in this mode (step 240) or in other modes (step 250), as described in the flow chart of FIG. 2.

In addition or as an alternative, it is conceivable that the PND device 10 will ask the user if he/she wants to save the drawn route as an electronic file in a compatible format, so that he/she will be able to comfortably use it in the future in more favourable circumstances, by using the previously described import mode, for the purpose of entering the roads it is made up of.

The fourth mode relates to confirming roads under construction which have been finished and become operational. Typically roads are included which are planned to be completed within a given time. Their layout is public, so that map providers can enter it and the respective attributes before such roads actually become available. Unlike the other roads, these roads are not used for route calculation and are displayed differently from other roads of the same type. They are usually displayed as a discontinuous curve, as shown by way of example in FIG. 20 for the highway section under construction 2010, which for the rest has graphic characteristics wholly similar to those used for the operational highway section 2030.

Figure 19:
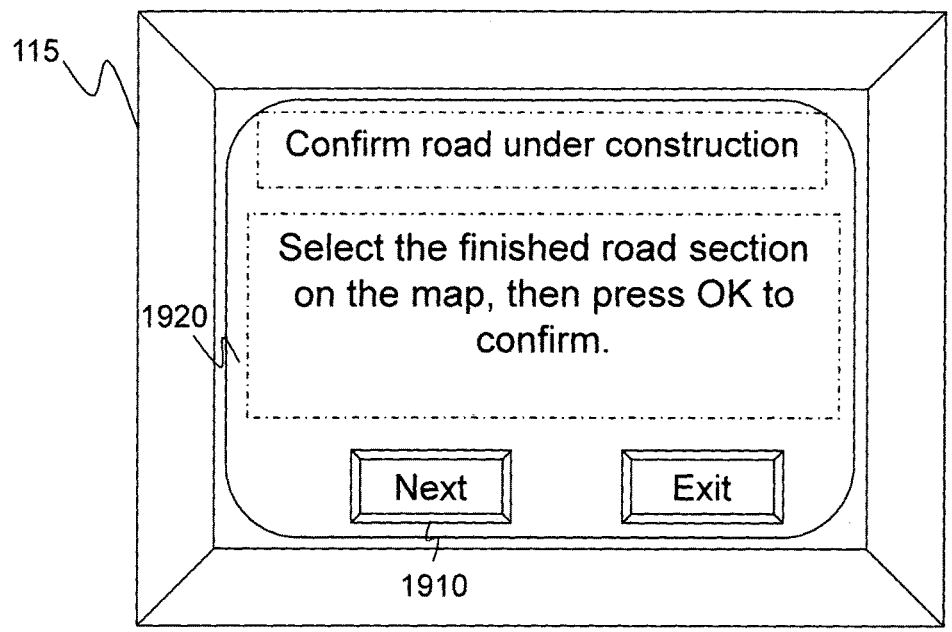

When the corresponding option 340 of FIG. 3 is selected, the PND device 10 will display a screen like the one shown in FIG. 19, wherein the user is prompted by the message 1920 to select on the map the road the construction and viability of which he/she wants to confirm. When the virtual key 1910 "Next" is pressed, an initial map frame will be displayed as in FIG. 5, according to criteria similar to those already described with reference to that figure. The user can then frame the map area that comprises the road involved by using the virtual keys 520 and 530, so as to obtain, for example, the screen of FIG. 20, which contains the highway section 2010 the viability of which he/she wants to confirm.

The user can thus select that section 2010, e.g. by touching a point belonging to it, and then press the virtual key 2010 "OK" to confirm. At this point, the PND device 10 will add the section 2010 to its road network marked as operational.

As an alternative or in addition, the PND device 10 may also allow said confirmation to be made through a selection from a hierarchical list sorted by geographic area, showing the roads under construction stored in the PND device 10. For example, when this search mode is selected for finding a road under construction, the user is first asked to specify the country which that road belongs to, and then the region possibly followed by the province, so as to obtain a limited number of selectable roads under construction. Furthermore, in order to speed up the selection process, the roads under construction may also be grouped based on their types, so that, for example, when selecting a certain region the screen will list all the roads under construction of a given type (highway, national road, local road, etc.) in that region.

Figure 20:
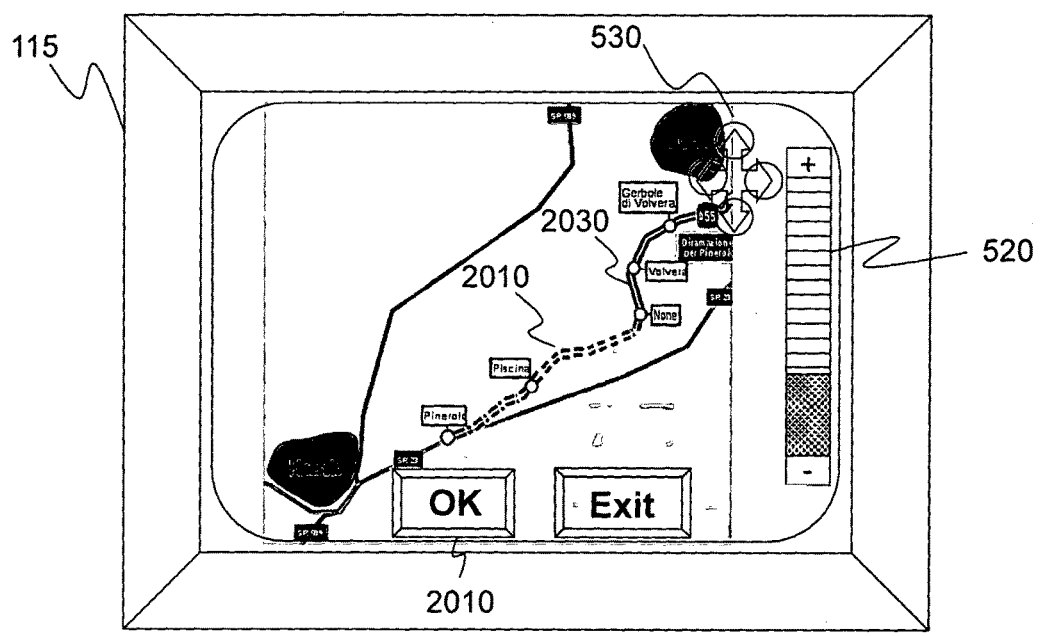

Still as an alternative or in addition to said entry modes, it is conceivable that, when it detects that it is travelling over at least a part of a road under construction or that such a road has been travelled over a number of times higher than a predetermined number, the PND device 10 will:

i) automatically add it to the operational road network, or ii) ask the user to confirm that it has become operational, e.g. after showing a map display thereof on the display 115 by means of a screen like the one shown in FIG. 20.

Regardless of the adopted modes among the above-described ones, the PND device 10 may also display other known road attributes (speed limits, practicability, road name, and the like) and give the user the possibility of modifying any attributes that should prove to be incorrect.

It is also possible to implement road entry modes resulting from a combination of two or more of the four entry modes described herein. For example, the user may be allowed to enter a road in "On-map drawing" mode and then verify the correctness of the manual drawing on the map by making a second entry in "On-the-fly capture" mode to confirm and correct the first one. The user will thus be able to find any errors in the manual drawing by detecting points of the road layout via the GNSS module 100 of the PND device 10.

Likewise, as aforementioned, there may be an entry mode obtained by combining the above two modes in reverse time order: the user may first capture the road layout by travelling over it in the third entry mode, and then integrate the layout if there are any gaps or discontinuities due to areas, met while travelling, where the GNSS signal is not receivable because of natural obstacles like, for example, trees, urban canyons, etc.

This combined mode category also includes the aforementioned possibility of allowing the user to save a road layout captured on the fly as an electronic file. Said electronic file can subsequently be imported in the second entry mode.

Figure 23:
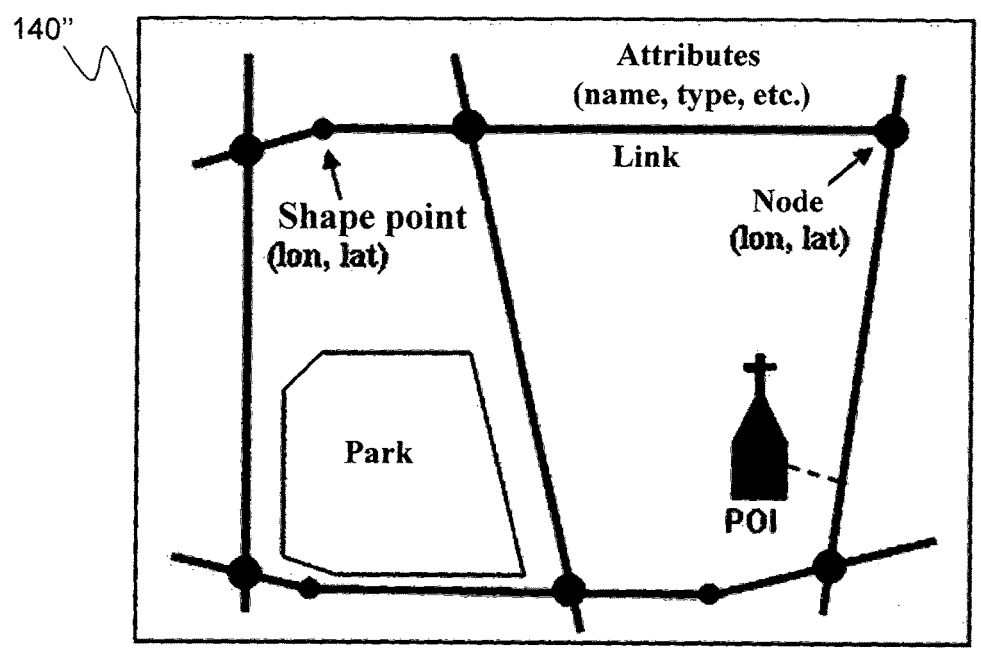
FIG. 23 shows in detail a map database used by the invention.

It will now be discussed more in detail how the interactive procedure for entering new roads described so far can be advantageously implemented. Typically, the map 140 stored in the memory of the device 10 can be represented in two ways: a graphic representation 140' in any format (e.g. bitmap or vectorial) that can be presented on the display 115, which visualizes, in a predetermined manner, the geographic entities present on the territory (roads, parks, rivers, railways, industrial areas, etc), and a corresponding data representation 140", which, wherever necessary, shows in any valid manner information about the objects shown on the map, as schematically illustrated by way of example in FIG. 23.

The map stored in the memory 130 is nevertheless just one: it is the same map of a certain territory, in two different representations; the way in which a geographic entity is associated with the graphic visualization is wholly unimportant for the purposes of the present invention, and the same applies to the particular computer data structure (e.g. graphs, adjacency matrices, record lists, pointer vectors, or any combination thereof) with which said map data representation 140" is implemented in the PND device 10.

The roads, referred to herein as "Links", are represented as connections between end points called "Nodes" that define the outermost points thereof, each characterized by a position expressed in terms of longitude (lon) and latitude (lat). Other roads ("Links") may also be afferent to said node, in which case the Nodes represent crossings of multiple roads. Moreover, Links may contain so-called shape points, also characterized by a position expressed in terms of longitude and latitude, which are used for denoting the shape of the road at the ends of sections thereof which can be considered to be straight.

Attributes may be associated with each Link, such as type (highway, national road, etc.), name (via Bellini, A55, SS23), viability, and the like. POI's (Points of Interest) may also be associated with a road ("Link"); such Points of Interest are accessible from that road and may be characterized by a position, similarly to shape points. The network of Links corresponds to the road network of the map, which can be used to determine routes to a given destination according to different criteria (shortest route, fastest route, cheapest route) and based on the entity involved (car, motorcycle, public transportation, horse, bicycle or pedestrian). Other entities may also be represented, of course, such as the Park of FIG. 23, having a given position and a given extension, which however is not of any interest for the present description.

In order to implement the present invention, it is sufficient that the microprocessor 120 and the map 140 stored in the memory 130 are configured in a manner such that the user is allowed to enter new Links characterized by certain Attributes, End Nodes and Shape Points in accordance with, for example, the above-described entry modes. The data interactively supplied by the user with the help of the PND device 10 are read by the microprocessor 120 through the data entry unit 115, processed to be transformed in a way which is compatible with a data representation 140" of the map 140, such as the one shown in FIG. 23, and stored into the memory 130, combined with the road network data already present in said representation 140".

Figure 14:
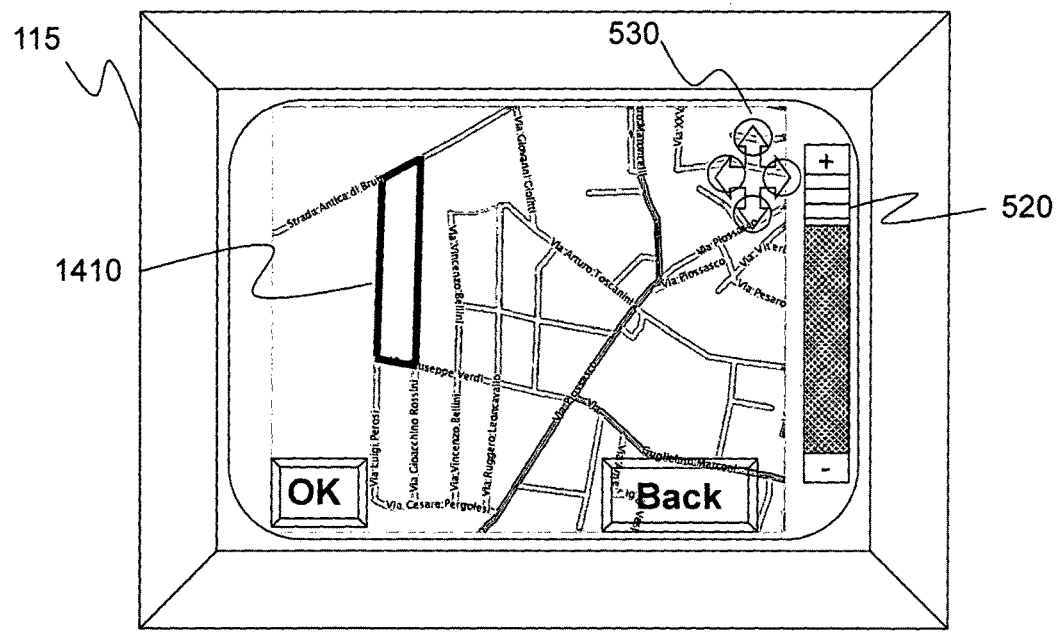

More concretely speaking, if the road being entered is taken from the straight section between the points A and B of the route 1410 of FIG. 14, the microprocessor 120 will add two Nodes "A" and "B" in the positions (latitude and longitude) corresponding to the respective points of the map, and a Link between these two Nodes having as Attributes those entered by the user during the entry procedure, e.g.: local road, name "Via Puccini", and so on). If it has been set so by the user, this road will be available for use in route calculations, at least for those entities that can travel over it, and will be displayed on the map for those users who have been authorized to see it.

In order to store any attributes which are not generally included among the Attributes of the Links of the map data representation 140", there may be additional fields containing, for example, the user who entered the Link, date and time of entry, the list of users allowed to modify it and the type of operation allowed. This information may be made to appear on the display 115, e.g. upon a user's command, when travelling over that specific road or on other occasions which can be defined by the manufacturer and/or by the user of the device 10.

In general, the road just entered can advantageously be displayed in the same way as those of the same type already present in the map 140. Alternatively, one may add other Attributes of the Link corresponding to that road in order to determine the associated display mode, such as, for example, a "flag" variable to define whether the road should be displayed in the same way as those of the same type already present in the map 140 or not; in the latter case, it will also define how it should be displayed. For example, a certain graphic characteristic of the graphic map representation 140' (colour, shading, etc.) may be associated with a user and applied to all Links entered by that user, so as to facilitate a quick recognition of the author of the entry. The association between graphic characteristic and user may be made adjustable through the control menu of the PND device 10. A user may also be associated with more than one graphic characteristic.

In order to implement the fourth entry mode, "Construction confirmation", an additional field may be included among the Link Attributes which contains information about whether that road is under construction or not. If the microprocessor 120 receives data from the entry unit 115 confirming that said road has been finished, it will update the corresponding field to include that road into the operational road network. Of course, if the construction of the road is confirmed, the display mode thereof will be changed accordingly, e.g. by switching from the dashed-line representation of FIG. 20 to a continuous-line representation.

In order to save memory, it is conceivable that Links may have a variable number of Attributes; if a Link does not contain a certain Attribute, this means that the latter is not present or takes a default value. For example, in this embodiment of the invention a given Link corresponding to an operational road of the map 140 will lack the respective field indicating whether it is under construction or operational, in that the latter condition is the default one.

Preferably, the roads entered by a user are stored into the map 140 in editable form, i.e. they can be modified by authorized users as defined by the manufacturer of the PND device 10 or by the user who is making the entry. In fact, if the latter realizes that he/she has made some mistakes during the entry procedure, he/she will be able to correct such mistakes by using functions and commands made available by the PND device 10 itself. For example, the control menu of the device may include an item called "Edit entered roads", by selecting which the user can modify some or all of the road-characterizing elements, such as layout and attributes (type, name, permissions, practicability, visibility, and so on).

Figure 5:
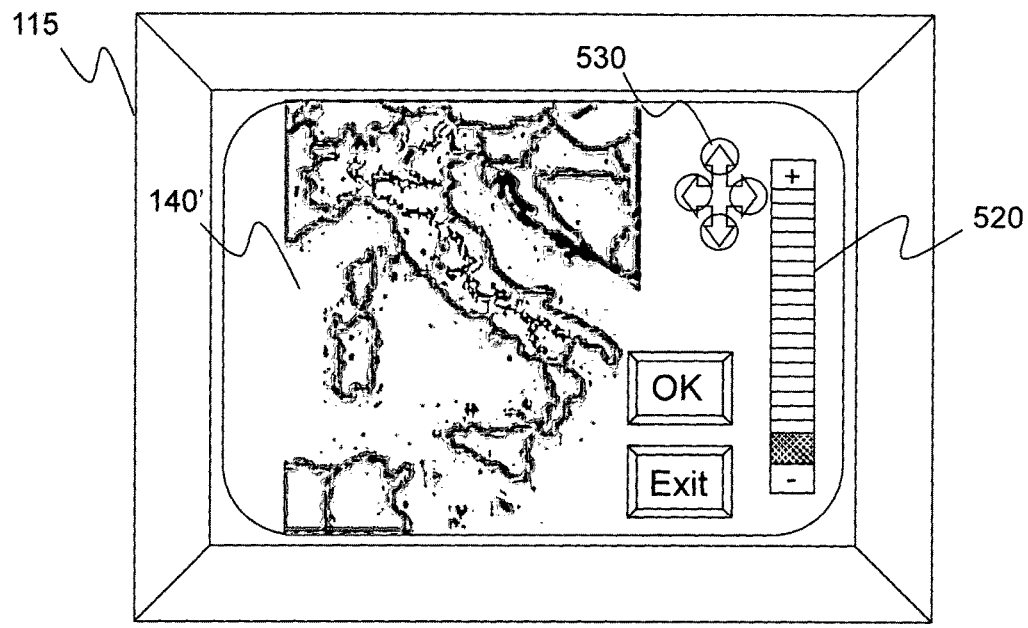
Figure 6:
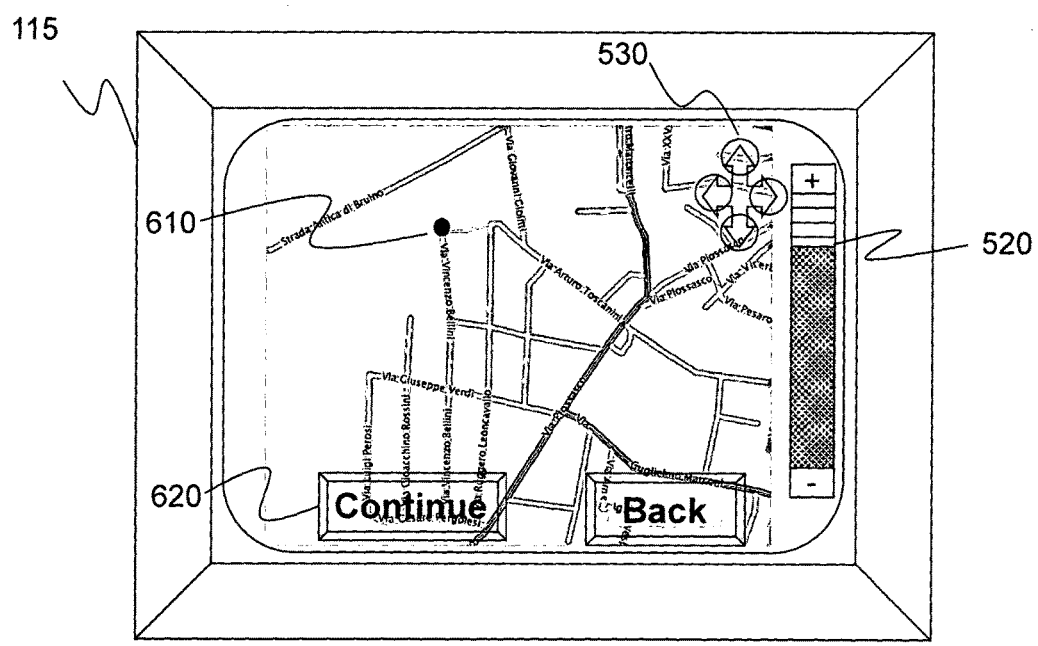

The PND device 10 may allow the user to select a road directly on the map, e.g. through a selection procedure similar to the one already described for the "On-map drawing" mode with reference to FIGS. 5 and 6. As an alternative or in addition, the PND device 10 may also show a register containing a list of all the previously made road entry operations that the active user is allowed to modify, e.g. indicating the name of the entered road, name of the city or area it belongs to, date and time of entry, author identifiers, and the like. The user can select the previously entered road that he/she wants to modify and then do the desired editing.

Changes made by users may also be stored into the register and treated like any road entry operation. A field may thus be added to the register to indicate the type of operation carried out, i.e. whether it is an entry or a modification, and what kind of modification has been made (change of name, layout, viability, and so on).

After the selection step, the user is allowed to do the actual editing by selecting the elements to be modified and by entering modified data according to procedures which are similar or easily referable to those already described for entering data relating to new roads or to roads defined as not viable.

As an option, one may also be allowed to modify at least some of the roads included in the map 140, which is usually supplied by the manufactured together with the PND device 10. This is particularly advantageous for crossings, in that there is now a widespread tendency to transform crossings, with or without traffic lights, into roundabouts, which ensure better traffic flow and road safety. To implement this functionality, it is sufficient that the Nodes of FIG. 23 can be of either the "crossing" or "roundabout" type, e.g. by adding a suitable field specifying the type and supplementary fields specifying other characteristics which are typical of roundabouts. Alternatively, one may add to the data representation 140" of the map 140 a new type of object, the Roundabout, characterized by its own distinctive parameters, i.e. external radius, internal radius, centre position and affluent roads.

When the user, through a specific edit procedure, signals that a certain crossing has been transformed into a roundabout, the microprocessor 120, depending on the adopted embodiment, will change the type of Node associated with the crossing concerned from Crossing to Roundabout in the data representation 140", also adding the additional values of the latter (external and internal radius length and position of the central point), or it will replace the Node concerned with a Roundabout having the characterizing parameters entered by the user through the user interface 115. The mode of graphic representation of the object involved in the transformation from crossing to roundabout, when shown on the display 115, will be changed accordingly based on predefined rules for this type of objects.

Another category of roads which are often subject to changes is that of drivable trails, i.e. roads that can only be travelled by car very slowly and with difficulty because they have not been asphalted. Often these trails will sooner or later be asphalted, thus becoming local traffic roads (local roads) that can be travelled over without difficulty by any kind of car. The map data representation 140" can therefore be structured in a manner such that at least the roads belonging to this category can be changed in the road type attribute from trail to local road, and possibly can also be updated in their practicability and viability attributes.

In order to make it easy to cancel any changes made, the PND device 100 may be made capable of displaying the register of the entry and edit operations carried out, sorted by date and/or grouped by author and/or by geographic region of the roads concerned, whereupon the user will have to select one operation from the register to restore the map 140 and its relative data representation 140" to the ones prior to the selected operation. To do so, the PND device 10 suitably stores the map situation before any entry or edit operation, so that it can be restored upon request from any authorized user.

In order to protect the result of the entry or edit operations carried out, it is conceivable that, when turning on or resetting the PND device 10, the system will ask for the user's credentials, which may be associated with specific permissions to execute entry or edit operations, or to see certain roads of a given set or belonging to a given category, or to see information associated therewith, such as notes about the roads, added personal places, and the like.

In addition or as an alternative, it is possible to define one or more use profiles of the PND device 10 (e.g. for vehicular, cycling or pedestrian applications), whether associated with a user or not. According to the selected profile, it is possible to display only those roads, added or modified by the user, whose type and practicability and viability characteristics are such as to allow them to be travelled over by the means of transport associated with the currently selected use profile. This visibility may relate to the mere visualization on the display 115 or to the inclusion of the added or modified roads in the calculation of the routes to a given destination set by the user. For example, taking into account the use profile for an "ordinary vehicle", i.e. not an all-terrain vehicle, in the former case paths and trails defined as not drivable with ordinary vehicles will not be displayed on the map; in the latter case they will not be taken into consideration in the calculation of any route requested by the user. Vice versa, if the currently active use profile is the "pedestrian" one, then paths and trails will be displayed on the map and taken into account in the calculation of the user's routes.

It is particularly advantageous to ensure that any information about the road network of the map 140 which has been edited by a user is stored into the memory 130 in a way distinct from that of the original map 140 supplied by the manufacturer of the PND device 10 or anyway present therein at the time of purchase. In this manner, should the map 140 be replaced with an updated version, it will be possible to at least partially re-apply to the new version the changes previously made by the user to the old version. This can be done in several modes, even combined with each other, according to options selectable by the user during the update process or through the interactive menu of the PND device 10.

A first mode is the automatic one: during the update process, the PND device 10 verifies if the new version includes the changes made to the road network by a user, in which case it will remove the related road information from the memory 130 without consulting or informing the user, since such information has been assimilated in the newly updated map. In a second map update mode, if there are any partial discrepancies about the layout and/or the attributes of the road (type, name, viability, practicability, etc.) which are judged to be unacceptable by the PND device 10 based on predetermined criteria, the device may ask the user to confirm the substitution of his/her own modification for the homologous one included in the updated version of the map. The criteria based on which any discrepancies are judged to be unacceptable may be defined by the user and/or preset when manufacturing the PND device 10.

In the event that road network information entered by the user is not included in the new version of the map, such information may be entered or associated therewith in a manner such that it will be used for displaying those areas of the map 140 to which such road information relates and/or for computing the routes to destinations set by the user. Optionally, the user may be asked to confirm the application of the changes made to the previous version of the map 140 to the new version. Of course, all auxiliary information will be kept as well.

The data and command entry unit may advantageously be implemented as a touch screen, in that it makes the PND device 10 especially compact and practical to use. It may however be replaced with any other man-machine physical interface unit which allows issuing commands and entering data necessary for implementing the present invention, such as, for example, a keypad, a mouse coupled to an on-screen pointer, a voice command unit, and the like.

The features of the present invention, as well as the advantages thereof, are apparent from the above description.

A first advantage of the method according to the invention is that the user of a personal navigation device can update a map in real time as soon as he/she realizes that road layouts have changed or that there are new roads or newly discovered roads which should be stored into the map for future use or for the calculation of new routes.

A second advantage of the method according to the present invention is that the user of a personal navigation device can directly eliminate, without waiting for the map provider to intervene, any discrepancies between the road network stored in his/her map and the actual road network on the territory.

A further advantage of the method according to the present invention is that the personal navigation device can be used by a wide variety of users (pedestrians, car drivers, hikers, drivers of heavy vehicles) and vehicles (bicycles, motorcycles, motocross motorcycles, cars, all-terrain vehicles, heavy vehicles).

The method for managing a map of a personal navigation device and the personal navigation device implementing said method described herein by way of example may be subject to many possible variations without departing from the novelty spirit of the inventive idea; it is also clear that in the practical implementation of the invention the illustrated details may have different shapes or be replaced with other technically equivalent elements.

It can therefore be easily understood that the present invention is not limited to a method for managing a map of a personal navigation device and a personal navigation device implementing said method, but may be subject to many modifications, improvements or replacements of equivalent parts and elements without departing from the inventive idea, as clearly specified in the following claims.

The invention claimed is:

1. A personal navigation device comprising:
   a display, configured to display a map;
   a GPS receiver configured to determine a current position of said personal navigation device;
   a physical command and data entry unit physically operable by a user and configured to receive commands and data regarding roads represented on said display;
   a power supply unit configured to supply energy to said personal navigation device;
   a non-volatile memory configured to store a map provided by a map provider wherein the map includes a road network comprising roads of different types, the roads of different types including a first set of roads defined as operational, and second set of roads defined to be under construction and not operational, wherein said second set of roads are, not operational because the second set of roads are not finished yet and are not used for route calculations; and a processor being operatively coupled to said GPS receiver, said physical command and data entry unit, said non-volatile memory and said display, wherein said processor is configured to manage the map by:

showing on said display a portion of said map comprising roads of both said first and second sets of roads wherein roads defined to be under construction on said display are represented within said road network in a graphical way different from other roads that are not under construction, and updating the map in real time, based upon an event detected by said processor involving at least one road of the second set of roads defined as under construction within said map, wherein said map is not being updated in real time with map data from a third-party map provider, and wherein updating the map in real time further comprises:

defining said at least one road of said second set of roads as a new operational road which has been finished and has become operational;

entering a record of said new operational road in a first record set describing said first set of roads and removing a record of said new operational road from a second record set describing said second set of roads;

storing said record of said new operational road in said first record set with the map in said non-volatile memory so that the data relating to the new operation road will not be lost following an interruption of the power supply to said device;

representing said new operational road in the same graphical way consistent with the roads of the same type present in said first set of roads included in the road network of said map, and using said record of said new operational road in said first record set in route calculations;

wherein said event comprises:

said physical command and data entry unit receives from said user a selection of said new operational road record confirming that said new operational road has been finished during an interactive procedure wherein said at least one road of the second set is shown on said display within said road network in a graphical way different from other roads that are not under construction of the same type pertaining to said first set of operational roads.

2. The device according to claim 1, wherein defining said at least one road of second set of roads as a new operational road, by the processor, further comprises:

selecting a map region;

displaying on said display the second set of roads under construction pertaining to said selected map region; and selecting one of the displayed second set of roads.

3. The device according to claim 1, wherein said GPS Receiver is further configured to:

detect that the navigation device is located in a starting point of the said at least one road under construction to be defined as the new operational road;

acquire, as a starting point of said new operational road, a current position detected by said GPS receiver upon receiving a specific triggering command from the user; and trace the current detected position as being part of said new operational road until receiving a specific command from the user by means of said physical command and data entry unit specifying an ending point of said new operational road that has become operational.

4. The device according to claim 1, wherein said processor is configured to:

display on said display a portion of said map comprising said at least one of said road under construction;

designate that said at least one road under construction has become operational by interacting with the graphically differentiated representation of the at least one road that has become operational on said display using said physical command and data entry unit.

5. The device according to claim 1, wherein said first and second record sets comprise layouts and attributes, and wherein said attributes comprise road type and name fields.

6. The device according to claim 5, wherein said attributes comprise a visibility field describing whether a road is displayed or not displayed depending whether a user is currently logged into the personal navigation device.

7. The device according to claim 1, wherein a record of said second record set comprises a field that defines operational permissions of a user of the device, and wherein a record of said second record set is reversibly combined with a record of said first record set for a user having the corresponding operational permissions.

8. The device according to claim 1, wherein a record of said second record set entered by means of said data selection entry session through said physical command and data entry unit can be modified by a user after said interactive procedure, if said user has permissions required for making the modification.

9. The device according to claim 1, wherein activation of a visualization of said new operational road in the representation of the road network of the map on the display depends on a user who entered said new operational road or on a user profile associated with the personal navigation device.

10. The device according to claim 1, wherein a mode of graphic visualization on the display of said second set of roads defined as under construction is influenced by the user through adjustments entered through the physical command and data entry unit.

11. The device according to claim 1, where the processor is further configured to activate an automatic notification to a predetermined remote server that said at least one road defined to be under construction has been entered into said first set of roads.

12. The device according to claim 1, wherein the different types of roads include highways, national roads, local roads, trails, and/or paths.

13. A personal navigation device comprising:

a display, configured to display a map;

a GPS receiver configured to determine a current position of said personal navigation device;

a physical command and data entry unit physically operable by a user and configured to receive commands and data regarding roads represented on said display;

a power supply unit configured to supply energy to said personal navigation device;

a non-volatile memory configured to store a map provided by a map provider wherein the map includes a road network comprising roads of different types, the roads of different types including a first set of roads defined as operational, and second set of roads defined to be under construction and not operational, wherein said second set of roads are, not operational because the second set of roads are not finished yet and are not used for route calculations; and a processor being operatively coupled to said GPS receiver, said physical command and data entry unit, said non-volatile memory and said display, wherein said processor is configured to manage the map by:

showing on said display a portion of said map comprising roads of both said first and second sets of roads wherein roads defined to be under construction on said display are represented within said road network in a graphical way different from other roads that are not under construction, and updating the map in real time, based upon an event detected by said processor involving at least one road of the second set of roads defined as under construction within said map, wherein said map is not being updated in real time with map data from a third-party map provider, and wherein updating the map in real time further comprises:

defining said at least one road of said second set of roads as a new operational road which has been finished and has become operational;

entering a record of said new operational road in a first record set describing said first set of roads and removing a record of said new operational road from a second record set describing said second set of roads;

storing said record of said new operational road in said first record set with the map in said non-volatile memory so that the data relating to the new operation road will not be lost following an interruption of the power supply to said device;

representing said new operational road in the same graphical way consistent with the roads of the same type present in said first set of roads included in the road network of said map, and using said record of said new operational road in said first record set in route calculations;

wherein said event comprises:

said GPS receiver detects that said personal navigation device is traveling over at least a portion of a road that has been traveled over a number of times higher than a predetermined number of times.

* * * * *